United States Patent [19]

Gardner

[11] Patent Number: 5,504,786
[45] Date of Patent: Apr. 2, 1996

[54] OPEN LOOP PHASE ESTIMATION METHODS AND APPARATUS FOR COHERENT COMBINING OF SIGNALS USING SPATIALLY DIVERSE ANTENNAS IN MOBILE CHANNELS

[75] Inventor: Steven H. Gardner, San Diego, Calif.

[73] Assignee: Pacific Communication Sciences, Inc., San Diego, Calif.

[21] Appl. No.: 132,091

[22] Filed: Oct. 5, 1993

[51] Int. Cl.$^6$ .............................. H04B 7/10; H04L 1/02
[52] U.S. Cl. ........................ 375/347; 375/355; 455/137
[58] Field of Search ........................... 375/100, 106, 375/99, 40, 267, 355, 346, 347; 455/132, 137, 139; 324/77 R

[56] References Cited

U.S. PATENT DOCUMENTS

| | | | |
|---|---|---|---|
| 3,783,385 | 1/1974 | Dunn et al. | 455/137 |
| 5,012,493 | 4/1991 | Hirai et al. | 375/100 |
| 5,031,193 | 7/1991 | Atkinson et al. | 375/14 |
| 5,203,023 | 4/1993 | Saito et al. | 455/137 |
| 5,280,637 | 1/1994 | Larosa et al. | 375/100 |

FOREIGN PATENT DOCUMENTS 0397386  11/1990  European Pat. Off. .
0430481   5/1991  European Pat. Off. .

Primary Examiner—Stephen Chin
Assistant Examiner—Tesfaldet Bocure
Attorney, Agent, or Firm—Blakely, Sokoloff, Taylor & Zafman

[57] ABSTRACT

Open loop phase estimation methods and apparatus for coherent combining of signals on mobile channels using spatially diverse antennas are disclosed. In accordance with the method, the signals from each of two antennas are demodulated using inphase and quadrature components of a local carrier oscillator to provide RF demodulated inphase and quadrature components of the output of each antenna. These components are simultaneously sampled at a sample rate and digitized to provide the digitized components of the two signal vectors. A phase estimator vector having a phase equal to the difference in phase between the two signal vectors of each successive sample time is determined. An average phase estimator vector for a group of successive signal vectors is determined, and is used as the estimated phase difference between the signal vectors at the middle of the group of successive signal vectors to align the respective signal vectors prior to the same being combined into a single signal vector. Details of the method are disclosed, including variations such as the extension of the method to more than two antennas.

18 Claims, 1 Drawing Sheet

OPEN LOOP PHASE ESTIMATION METHODS AND APPARATUS FOR COHERENT COMBINING OF SIGNALS USING SPATIALLY DIVERSE ANTENNAS IN MOBILE CHANNELS

BACKGROUND OF THE INVENTION

1. Field of the Invention

The present invention relates to the field of mobile digital communications, and more particularly, cellular communications.

2. Prior Art

One of the most useful techniques for improving receiver performance in the mobile (Rayleigh) channel is to use spatial diversity; that is, use two (or more) antennas spaced far enough apart so that the characteristics of the fading encountered by the desired signal are independent for each of the two receiver paths. Considerable performance improvement can be achieved because the likelihood of both signals being impacted by a deep fade at the same time is far smaller than the probability that a single signal encounters a deep fade.

There are many well known schemes for making use of the signals from the two antennas. The simplest of these is to just chose the antenna that provides the strongest signal. This is referred to as selection diversity. The best performing approach for use of the signals from the two antennas is called "maximal ratio coherent combining" (see "Microwave Mobile Communications", W. C. Jakes, p. 316–319 (1974)). In this scheme, the signals from the two antennas must be aligned in phase, weighted with gains proportional to their signal voltage to noise power ratios, and summed. An alternative scheme that also provides very good performance simply aligns the phases of the signals and then sums them without weighting.

In either case, the most difficult aspect of the problem is determining how to align the phases. The problem is inherently very similar to designing a phase tracking circuit for coherent demodulation. A circuit or algorithm must be developed that determines the phase difference between the two signals at any given time, removes the difference from one of the two, and then sums the vectors. Tracking the phase difference with a phase locked loop (PLL) is possible under some circumstances, but given the rate at which the phase changes in the US cellular band for most mobile velocities of interest, the PLL bandwidth required to track is so wide that the loop design is unstable or cannot work in the presence of any significant amount of noise.

BRIEF SUMMARY OF THE INVENTION

Open loop phase estimation methods and apparatus for coherent combining of signals on mobile channels using spatially diverse antennas are disclosed. In accordance with the method, the signals from each of two antennas are demodulated using inphase and quadrature components of a local carrier oscillator to provide RF demodulated inphase and quadrature components of the output of each antenna. These components are simultaneously sampled at a sample rate and digitized to provide the digitized components of the two signal vectors. A phase estimator vector having a phase equal to the difference in phase between the two signal vectors of each successive sample time is determined. An average phase estimator vector for a group of successive signal vectors is determined, and is used as the estimated phase difference between the signal vectors at the middle of the group of successive signal vectors to align the respective signal vectors prior to the same being combined into a single signal vector. Details of the method are disclosed, including variations such as the extension of the method to more than two antennas.

DETAILED DESCRIPTION OF THE INVENTION

Figure 1:
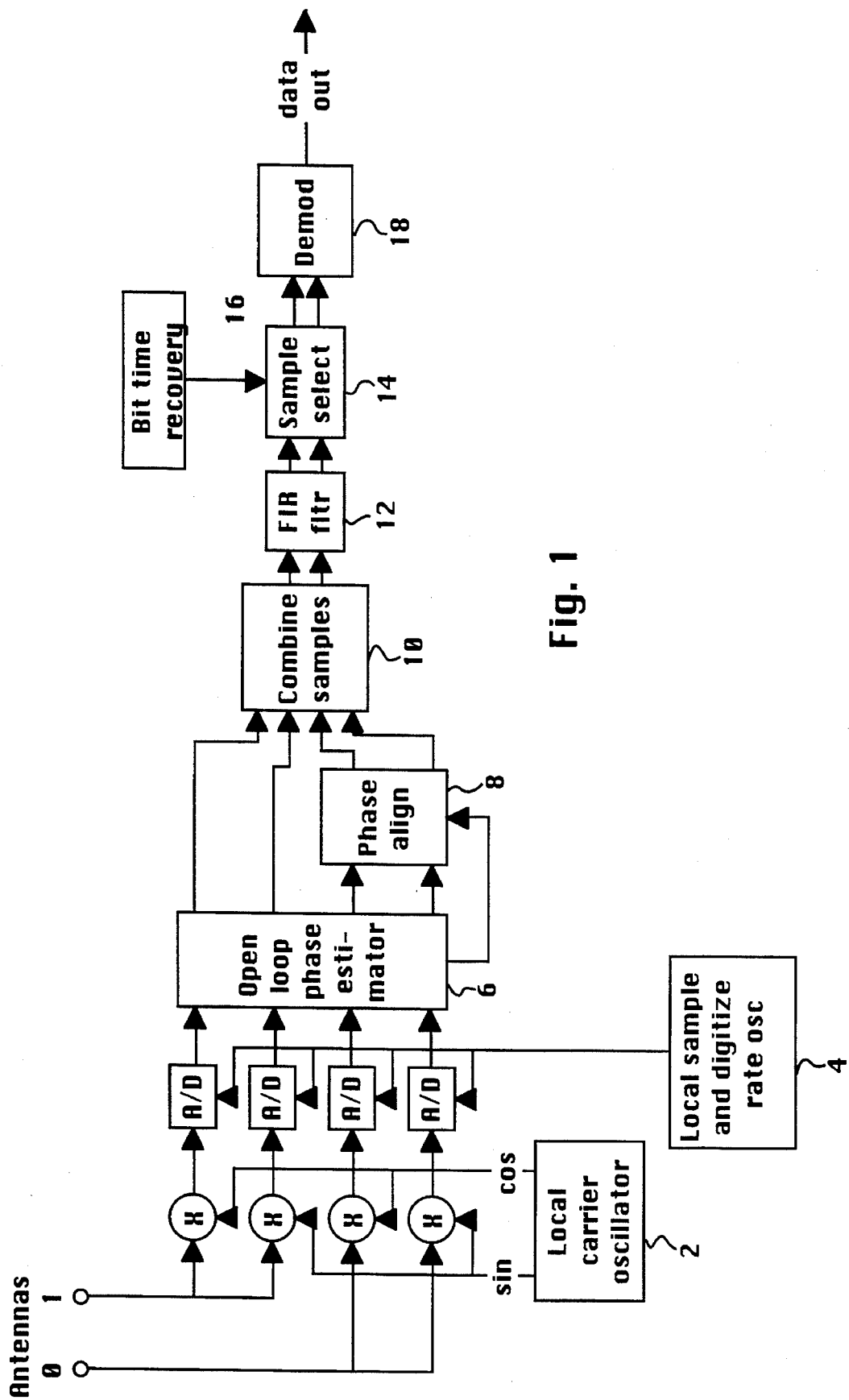
FIG. 1 is a block diagram of a cellular radio receiver for receiving phase shift keyed or frequency modulated digital information modulated on an RF carrier incorporating the present invention.

First referring to FIG. 1, a block diagram of the receiver portion of a cellular radio used for mobile data communications and incorporating the present invention may be seen. While the system shown in the FIGURE may be used at the mobile units, it is particularly suitable for data base stations used in a mobile communications system.

As shown in FIG. 1, two spatially diverse antennas 0 and 1 are used, the antennas being spaced far enough apart so that the signal fading experienced by each antenna is substantially independent of the fading experienced by the other antenna. The RF signals received on the two antennas are down converted from RF by inphase and quadrature components of a local carrier oscillator 2. This down conversion provides inphase and quadrature analog signals for each of the two antennas. The phase of the down converted signal for each antenna will depend not only on the information bearing portion of the phase of the signal, but also the contribution due to phase changes caused by the channel, the difference in frequency between the local carrier oscillator 2 the transmitter oscillator, the contribution of intersymbol interference, and receiver front end noise and other interference. With respect to the information bearing portion of the phase, and the difference in frequency between the local and the transmitter oscillator and intersymbol interference, the phases will be substantially identical for the two antennas 0, 1. With respect to phase changes caused by the channel and receiver front end noise, the phases will be substantially independent for the two antennas 0, 1, as the separation of the antennas 0, 1 is large with respect to the wavelength of the RF signal.

The inphase and quadrature components of the RF demodulated signals from the two antennas 0, 1 are sampled at an appropriate multiple of the bit rate (typically four times the bit rate) of the channel under control of a local oscillator, and digitized. This is done by means of a local sample and digitize rate oscillator 4. The digitized inphase and quadrature components of each of the two signals then undergo a series of operations, many of which can be carried out in a processor under program control, such as by a Texas Instruments TMS 320, or alternatively a more conventional microprocessor. However, for purposes of FIG. 1, the various major functions are illustrated in separate blocks 8–18, representing the signal processing, but not necessarily the hardware organization for accomplishing the same. If desired, the function may instead be achieved in a hardware form.

The inphase and quadrature components of the two signals in digital form first undergo a phase difference detection wherein on a sample by sample basis, a good estimate of the actual phase difference between the two signals is obtained.

This phase difference is used to phase align, as shown in block 8, the two digitized signal vectors, in the specific embodiment being described by shifting the phase of the vector represented by the inphase and quadrature components of the signals derived from antenna 0 to be inphase with the corresponding vector represented by the digitized components of the signal for antenna 1. This allows the combining of the samples as shown in block 10, in the preferred embodiment by adding the same, though of course other methods of combining may also be used as desired.

In any event, the result of combining the inphase and quadrature components of the two signals is a single digitized inphase and a single digitized quadrature signal representing the single signal vector for the combined signals from the two antennas, thereby providing the desired spatial diversity in the inphase and quadrature components of the single signal vector. In the preferred embodiment, these digitized signals, taken at approximately four times the bit rate, are each digitally filtered by finite impulse response filtering, as shown in block 12, to provide the corresponding filtered inphase and quadrature components for demodulation, as shown in block 18, and bit time recovery, as shown in block 16. In the preferred embodiment, since the sample rate for digitizing is approximately four times the bit (symbol) rate, there will always be one sample set (inphase and quadrature components for the combined signal vector) which is no more than one eighth of a bit time away from the center of the bit time, and accordingly the corresponding sample set may be selected, as shown in block 14, for demodulation to provide sufficient accuracy in the data output. In other embodiments, a different sampling rate and/or selection method may be used. In the preferred embodiment, to advance or retard the sample selection 14 from the normal one in four, as required to make up for the inevitable but relatively small difference between the actual bit rate of the received signal and the corresponding local oscillator frequency divided by four, the recovered bit time is used as a reference to control the sample selection 14 as required. Various methods are well known for timing recovery itself, and accordingly details of timing recovery methods are not described in detail herein.

The open loop phase estimator 6 briefly described above will now be described in greater detail. The received phase for a given sample (n) from antenna 0 can be represented as:

$$\phi_{n,0} = \theta_n + N_{n,0} + \psi_{n,0}$$

and the phase for the sample from antenna 1 as:

$$\phi_{n,1} = \theta_n + N_{n,1} + \psi_{n,1}$$

where:

$\theta_n$ is the combination of the information bearing portion of the phase and differences between transmitter and receiver oscillators, and intersymbol interference, and is the same for samples from either antenna $N_n$ is the contribution of receiver front end noise and other interference $\psi_n$ is the contribution due to phase changes caused by the channel (including Doppler shifts and Rayleigh fading.

In vector form, the received samples are given by $(I_n, Q_n)$, where:

where:

$$I_{n,0} = \sqrt{A_{n,0}} \cos \phi_{n,0}$$

$$Q_{n,0} = \sqrt{A_{n,0}} \sin \phi_{n,0}$$

and:

$$I_{n,1} = \sqrt{A_{n,1}} \cos \phi_{n,1}$$

$$Q_{n,1} = \sqrt{A_{n,1}} \sin \phi_{n,1}$$

and where An is the power of the received vector.

The phase estimator begins by computing a vector representing the phase difference between these two samples. It does this by forming the vector $$(X_n, Y_n) = (I_{n,0}I_{n,1} + Q_{n,0}Q_{n,1}, Q_{n,0}I_{n,1} - I_{n,0}Q_{n,1})$$

which has phase:

$$\omega_n = \phi_{n,0} - \phi_{n,1} = N_{n,0} - N_{n,1} + \psi_{n,0} - \psi_{n,1}$$

The phase of vector $(X_n, Y_n)$ approximates the phase difference if the noise is small. This estimate is not very good if $N_n$ is of substantial size, which it will be for most practical systems. However, if the assumption is made that $\psi_n$ is linear with n over some time interval of m symbols, then the vector $(W_n, Z_n)$ formed by normalizing the vector sum of a list of 2m+1 consecutive values (m must be an integer) of $(X_k, Y_k)$ for k=n−m to k=n+m has a phase that is a good estimate of the value of $\psi_{n,0} - \psi_{n,1}$ in the middle of the list, because the signal to noise ratio of the estimate is increased by a factor equal to the number of samples averaged. As an alternative, the current symbol values could be left out of the averaging calculation, as this provides for the averaging of samples for an equal number of bit times before the sample in question with an equal number of bit times after the sample in question.

The parameter m is chosen to provide the best balance between the approximation of the linearity of $\psi_n$ with n and the desired reduction in signal to noise ratio (SNR) of the estimate vector, $(W_n, Z_n)$. If the vector $(I_{n,0}, Q_{n,0})$ is multiplied by the conjugate of $(W_n, Z_n)$ (which can be easily done by forming the vector product $(I_{n,0}, Q_{n,0})^*(W_n, -Z_n)$), then the resulting vector has phase $\theta_n + N_{n,0} + \psi_{n,1}$, which is the desired result. The phase differences between the signals from the two antennas have been removed (the noise contribution cannot be removed by any technique). The signals from the two antenna arms can now be combined, in the preferred embodiment by simply summing the two signal vectors. An MS-Fortran routine for performing the diversity combining described above is attached hereto as Appendix 1.

Thus the signals from spatially diverse antennas 0,1 have been combined in a seamless manner, free of switching transients, to provide a single signal vector much less subject to error inducing fading than either of the antenna outputs alone. Obviously, techniques for combining the two aligned signals other than direct summing may also be used if desired. For example, summing with unequal weightings could be used. Also if desired, the present invention could be extended to more than two antennas by pairing the first antenna output with each of the other antenna outputs and aligning each of the other antenna outputs to the first antenna output, and then summing or otherwise combining all antenna outputs.

While the present invention has been disclosed and described with respect to a certain preferred embodiment thereof, it will be understood to those skilled in the art that the present invention may be varied without departing from the spirit and scope thereof.

APPENDIX 1

```
c        *********************************************************
c        COHERENT DEMODULATION
c
c        only do this if there are more than 7 RS symbol errors
c
c        si() and sq() are the real and imaginary parts of the received samples
c        there are four complex samples per bit.
c
c        First correct the samples with the frequency estimate to remove most
c        of the carrier frequency error (the estimate is formed in a previous routine)
c        The frequency error estimate is given by phdelt, the phase delta per
c        sample
         If(enafrq.eq.1) then          ! do it only if enabled by user
            phcacc=0
            i12=size+9
            do 710 i=96,i12
c              compute new frequency correction vector
               phcacc=mod(phcacc+phdelt,32768)
               fraccq=sine(int(phcacc/128.))
               fracci=cosine(int(phcacc/128.))
c              apply frequency correction to the next sample pair
               xtmp=(si(i)*fracci-sq(i)*fraccq)/32768.
               sq(i)=(sq(i)*fracci+si(i)*fraccq)/32768.
710            si(i)=xtmp
            phcacc=phcacc+phacc1
         endif
         i12=1+size/4
         psumi=0.        ! initialize phase estimator accumulator
         psumq=0.
         even=1
         ccount=0
         m=0
         rserr=0
         rsflag=0
         cerr=0
         dec1=1
         plen=25         ! length of phase estimator; a parameter
         i11=i11+(45-plen)/2-1
         do 740 i=0,127
            sqri(i)=0.   ! initialize array of squared phase vectors
740         sqrq(i)=0.
         do 750 i=i11,i12
            i1=mod(i,128)               ! index for new phase vector
            i2=mod(i1+128-plen,128)     ! index for back end of sliding window acc
            i3=4*1+bsttim+1             ! index for choosing samples to filter
            i4=i-int((plen+1)/2)        ! index for decision bits to correct
            i5=mod(i4, 128)
c        pass the received samples through a matched filter with coefficients mf()
c        to create the filtered output samples ftti() and fttq(), with one complex filter
c        output per bit
            ftti(i1)=0.
            fttq(i1)=0.
            do 760 k=0,14
               k1=i3-k
               ftti(i1)=ftti(i1)+mf(k)*si(k1)
760            fttq(i1)=fttq(i1)+mf(i)*sq(k1)
c        open loop phase estimator
c
c        the phase estimator does the following main jobs:
c        1. strip the data contribution from each vector, leaving only something
c           related to the phase error (and noise, and iSi...these will average out)
c        2. average the phase error over a fixed window of time
c        3. "unwrap" the phase error...resolve 180 degree ambiguities that result
c           from steps one and two
c        4. correct the received sample with the estimate of the phase and make
c           decisions
c
c        first step: strip the data
c
c        ftti() and fttq() are the real and imaginary parts of received, filtered samples. There
c        are four samples per symbol
c
c        if we think of the signal as MSK with no timing error, iSi, noise, frequency, or phase
c        error, then on even bit times a 0 or 180 degree phase is sent while on odd bit times
c        +/- 90 is sent. If we double the received phase (by squaring the vector) we always get 0
c        on even bit times and always get 180 on odd bit times. If we invert all the odd results
c        after squaring, we always get zero for all of them. If there is a phase error, the resulting
c        vector has twice the phase error in it. If we average over some number of symbols we
```

-continued

APPENDIX 1

```
c       can remove the effects of noise and iSi to some extent. Moreover, in the presence of
c       a constant frequency error, the average over 2n-1 symbols is a good estimate of twice
c       the phase error present in the nth symbol
            sqri(i1)=even*(ftti(i1)**2-fttq(i1)**2)/65536.
            sqrq(i1)=even*(2*ftti(i1)*fttq(i1))/65536.
            even=-even            ! even goes +/-/+/-1
c       second step: average the phase vectors
c
c       this is done with a sliding window accumulator. We want to sum up the last 45 phase
c       vectors. Rather than adding 45 vectors every symbol, we keep a running sum and add
c       the newest vector and subtract off the one that's 46 symbols old. After we've done the
c       average, we have to extract the phase estimate by doing a vector square root, since the
c       average is an estimate of the square of the error vector. The vector square root is done
c       with a table lookup that's different from the frequency estimation; here instead of using
c       a normalized vector as the table index we use a vector that is scaled so that the greater
c       of I or Q is 255 and the smaller if I or Q (which is some 8 bit number) is used to address
c       the table. The table has four pages; one pair for the real part of the square root and the
c       other pair for the imaginary part. There are two sets of tables because the table has to
c       know whether the index is the I part of the vector or the Q part. The table is set up to
c       assume that the input is a vector in the first quadrant, and if it isn't, the table outputs
c       have to be swapped and sometimes inverted to fix it. There are 8 cases altogether,
c       depending on which octant the vector lies in (octant 1 is 0 to 45 degrees, octant 8 is
c       315 to 360 degrees)
            psumi=psumi+sqi(i1)-sqri(i2)
            psumq=psumq+sqrq(i1)-sqrq(i2)
            if(psumi.ne.0.or.psumq.ne.0) then     ! update the averager
            if(psumq.ge.0) then                   ! start the square root
              if(psumi.ge.0) then                 ! octants 1 thru 4
                if(psumi.gt.psumq) the  ! octant 1   ! octants 1 and 2
                  k0=psumq*255./psumi+.5
                  phai=vsrt(i0,0)
                  phaq=vsrt(k0,1)
                else           ! octant 2
                  k0=psumi*255./psumq+.5
                  phai=vsrt(k0,2)
                  phaq=vsrt(i0,3)
                endif
              else                                ! octants 3 and 4
c       in octants 3 and 4 your are looking for a vector with angle theta/2, but
c       because the lookup only spans the first quadrant you end up looking up a vector
c       with angle (180-theta)/2 = 90 - theta/2. To fix this you have to negate the angle
c       (by taking the conjugate: invert the imaginary part), and then add 90 degrees
c       (by swapping i and q and inverting the real part of the result). The combination
c       of these two things is the sample as just swapping the real and imaginary parts
                kz=psumq+psumi
                if(kz.gt.0) then                  ! octant 3
                  k0=psumi*255./psumq+.5
                  phaq=vsrt(k0,2)
                  phai=vsrt(k0,3)
                else           ! octant 4
                  k0=psumq*255./psumi+.5
                  phaq=vsrt(k0,0)
                  phai=vsrt(k0,1)
                endif
              endif
            else                                  ! octants 5 thru 8
              if(psumi.lt.0) then                 ! octants 5 and 6
c       in octants 5 and 6 you are looking for a vector with angle theta/2, but
c       you end up looking up a vector with angle (theta-180)/2 = theta/2 - 90.
c       To fix this, you add 90 degrees by swapping i and q and inverting the
c       real part of the result.
                if(psumi.lt.psumq) then           ! octant 5
                  k0=psumq*255./psumi+.5
                  phaq=vsrt(k0,0)
                  phai=-vsrt(i0,1)
                else                              ! octant 6
                  k0=psumi*255./psumq+.5
                  phaq=vsrt(k0,2)
                  phai=-vsrt(k0,3)
                endif
              else                                ! octants 7 and 8
c       in octants 7 and 8 you are looking for a vector with angle theta/2, but
c       you end up looking up a vector with angle (360-theta)/2 = 180 - theta/2.
c       To fix this, negate the angle (by taking the conjugate) and then add 180
c       degrees (by inverting both I and Q). Both operations result in just inverting
c       the real part.
                kz=psumq+psumi
                if(kz.lt.0) then                  ! octant 7
```

APPENDIX 1

```
            k0=psumi*255./psumq+.5
            phai=-vsrt(k0,2)
            phaq=vsrt(k0,3)
          else       ! octant 8
            k0=-psumq*255./psumi+.5
            phai=-vsrt(k0,0)
            phaq=vsrt(k0,1)
          endif
        endif
      endif
      else                            ! if the magnitude of the averager is 0
        phai=65536.
        phaq=0.
      endif
c
c   third step: unwrap the phase estimate
c
c   Now we are ready for the third step, which is
c   to do the unwrapping. Here the issue is that because we have averaged the squares of
c   the vectors and then taken the square root, the result we will get is a vector that has a
c   phase somewhere between 0 and 180 degrees. So if we had a constant frequency error
c   the estimator would output a correction vector that goes ...177,178,179,0,1,2... degrees
c   when it ought to go ...177,178,179,180,181,182... degrees. This is bad because it causes
c   periodic sign flips in the demodulated data. To fix this, we have to decide when the
c   vector has done such a jump, or in essence, if the difference between successive vector
c   outputs is more than 90 or less than -90 degrees, we conclude that we have "wrapped"
c   and we add 180 degrees to the output of the estimator from this point on. We make the
c   decision on the wrapping by means of, as usual, a cross product. If the real part is
c   positive then the phase change is in the right half plane, so no unwrapping.
      xtmp=phai*phaiold+phaq*phaqold
      if(xtmp.it.0) wrapiq=mod(wrapiq+1,2)
      phaiold=phai
      phaqold=phaq
      m=m+1
      if(m.it.plen) goto 750           ! still getting phase estimator primed
c
c   fourth step: correct the received symbol and make decisions
c
c   Multiply the received symbol by the conjugate of the phase
c   estimate vector to get the phase corrected. Make decision of even samples on I and
c   of odd samples on Q. Invert the decisions based on the status of the unwrapping bit.
c   Because the modulation is GMSK, there is a differential decoding operation that has
c   to be done to extract the real data.
      if(even.eq.1) then
        xtmp=(ftti(i5)*phai+fttq(i5)*phaq)/65536.
      else
        xtmp=(fttq(i5)*phai-ftti(i5)*phaq)/65536.
      endif
      if(wrapiq.eq.1) xtmp=-xtmp
      decide=0
      if(xtmp.gt.0) decide =1
      if(dec1.ne.decide) then          ! differential decode over one bit time
        if(even.eq.1) then
          dec(i4)=1
        else
          dec(i4)=0
        endif
      else
        if(even.eq.1) then
          dec(i4)=0
        else
          dec(i4)=1
        endif
      endif
      dec1=decide
750   continue
      end
```

I claim:

1. In a ground based mobile radio channel wherein information is modulated by an RF carrier to provide an RF signal which is broadcast over the air, a method of receiving the RF signal on a pair of spatially diverse antennas and coherently combining the RF signal received by each spatially diverse antenna comprising the steps of:

(a) receiving the RF signal on each of the pair of antennas and down converting each received RF signal using a local oscillator as a reference to provide an inphase and a quadrature component of the down converted signal from each antenna;

(b) simultaneously taking samples of the inphase and quadrature components of each down converted signal of step (a), digitizing the samples to provide a set of simultaneously taken digitized samples, and sequentially repeating step (b) to provide successive sets of simultaneously taken digitized samples;

(c) for a list of 2m+1 simultaneously taken digitized samples, determining, for each set of the simultaneously taken digitized samples in the list, the phase of the vector average of 2m+1 phase difference vectors, the phase of the vector average being computed by forming the vector sum of the difference between the phase of a signal vector formed by the digitized inphase and quadrature components of the down converted signal from one antenna and the phase of a signal vector formed by the digitized inphase and quadrature components of the down converted signal from the other antenna for the simultaneously taken digitized samples in the list;

(d) for each set of the simultaneously taken digitized samples, shifting the phase of one of the signal vectors formed by the digitized inphase and quadrature components of the down converted signal from one antenna, by the phase of the vector average determined in step (c) to approximately align the pair of signal vectors; and, (e) combining the aligned signal vectors for each set of simultaneously taken digitized samples, to provide a single combined signal vector.

2. The method of claim 1 wherein the step of combining the aligned signal vectors for each set of simultaneously taken digitized samples comprises the step of providing the additive combination of the inphase components of the aligned signal vectors to form the inphase component of the single combined signal vector, and of providing the additive combination of the quadrature components of the aligned signal vectors to form the quadrature component of the single combined signal vector.

3. The method of claim 1 wherein one antenna is a first antenna and the other antenna is a second antenna and wherein in step (c), the phase of the vector average of 2m+1 phase difference vectors is determined by forming, for each of the 2m+1 simultaneously taken digitized samples, a phase estimator vector having an inphase component and a quadrature component, the inphase component being responsive to the sum of: (i) the product of the inphase components of the signal vectors of the first and second antennas and (ii) the product of the quadrature components of the signal vectors of the first and second antennas, the quadrature component being responsive to the difference between: (i) the products of the inphase component of each of the signal vectors of the first antenna and the quadrature component of the signal vectors of the second antenna, and (ii) the product of the quadrature component of the signal vector of the second antenna and the inphase component of the signal vector of the first antenna, and providing an average phase estimator vector having an inphase phase estimator vector component, a quadrature phase estimator vector component and a phase angle equal to the phase angle of the sum of the 2m+1 phase estimator vectors.

4. The method of claim 3 wherein in step (d), the step of shifting the phase of one of the signal vectors formed by the digitized inphase and quadrature components of the down converted signal from one antenna by the difference in phase of the vector average determined in step (c) to approximately align the pair of signal vectors comprises the step of: multiplying one of the signal vectors by the conjugate of the phase estimator vector.

5. The method of claim 1 wherein, for each set of the simultaneously taken digitized samples, the phase of the vector average of 2m+1 phase difference vectors is computed from the phase of the vector average of the 2m+1 phase difference vectors by: (i) subtracting the phase difference vector for the first set of the simultaneously taken digitized samples of the 2m+1 phase difference vectors and (ii) adding the phase difference vector of the last set of simultaneously taken digitized samples of the 2m+1 phase difference vectors.

6. In a ground based mobile radio channel wherein information is modulated by an RF carrier to provide an RF signal which is broadcast over the air, a method of receiving the RF signal on a pair of spatially diverse antennas and coherently combining the RF signal received by each spatially diverse antenna, comprising the steps of:

(a) receiving the RF signal on each of the pair of antennas and down converting each received RF signal to provide an inphase and a quadrature component of the down converted signal from each antenna;

(b) simultaneously taking digitized samples of the inphase and quadrature components of each down converted signal of step (a) and sequentially providing the simultaneously taken digitized samples;

(c) determining, for each set of the simultaneously taken digitized samples, a phase of the vector average of 2m phase difference vectors, the phase of the vector average being computed by forming the vector sum of the difference between the phase of a signal vector formed by the digitized inphase and quadrature components of the down converted signal from one antenna and the phase of a signal vector formed by the digitized inphase and quadrature components of the down converted signal from the other antenna for the 2m samples;

(d) for each set of the simultaneously taken digitized samples, shifting the phase of one of the signal vectors formed by the digitized inphase and quadrature components of the down converted signal from one antenna in accordance with the phase of the vector average of the phase difference vectors between the respective signal vectors determined in step (c), to approximately align the pair of signal vectors; and, (e) combining the aligned signal vectors for each set of the simultaneously taken digitized samples, to provide a single combined signal vector.

7. The method of claim 6 wherein in step (c), the 2m samples include m samples taken after a predetermined set of simultaneously taken digitized samples and m samples taken before the predetermined set of simultaneously taken digitized samples.

8. The method of claim 7 wherein in step (c), the 2m samples include the set of the simultaneously taken digitized samples for which the phase of the vector average of 2m phase difference vectors is being determined.

9. The method of claim 6 wherein the step of combining the aligned signal vectors for each set of the simultaneously taken digitized samples comprises the step of providing the additive combination of the inphase components of the aligned signal vectors to form the inphase component of the single combined signal vector, and of providing the additive combination of the quadrature components of the aligned signal vectors to form the quadrature component of the single combined signal vector.

10. The method of claim 6 wherein one antenna is a first antenna and the other antenna is a second antenna and wherein in step (c), the phase of the vector average of 2m phase difference vectors is determined by forming, for each of the 2m simultaneously taken digitized samples, a phase estimator vector having an inphase component and a quadrature component, the inphase component being responsive to the sum of (i) the product of the inphase components of the signal vectors of the first and second antennas, and (ii) the product of the quadrature components of the signal vectors of the first and second antennas, and the quadrature component being responsive to the difference between: i) the product of the inphase component of signal vector of the second antenna and the quadrature component of the signal vector of the first antenna and (ii) the product of the inphase component of the signal vector of the first antenna and the quadrature component of the signal vector of the second antenna, and providing an average phase estimator vector having an inphase phase estimator vector component, a quadrature phase estimator vector component and a phase angle equal to the phase angle of the sum of the 2m phase estimator vectors.

11. The method of claim 10 wherein in step (d), the step of shifting the phase of one of the signal vectors formed by the digitized inphase and quadrature components of the down converted signal from one antenna by the difference in phase of the vector average determined in step (c) to approximately align the pair of signal vectors comprises the step of: multiplying one of the signal vectors by the conjugate of the phase estimator vector.

12. In a ground based mobile data communications channel wherein either the phase or the frequency of an RF carrier is modulated to provide an RF signal which is transmitted over the air, a method of coherently combining the RF signal received on two spatially diverse antennas comprising the steps of:

a) receiving the RF signal on each of the antennas and down converting each received RF signal using a local oscillator to provide an inphase and quadrature component of each down converted signal;

b) simultaneously taking sample vectors formed by sampling the inphase and quadrature components from step (a), digitizing the simultaneously taken sample vectors to provide a set of simultaneously taken digitized sample vectors, and sequentially repeating step (b) to provide successive sets of simultaneously taken digitized sample vectors;

c) selecting a simultaneously taken digitized sample vector of one of the received RF signals as a reference sample vector, and determining for each of the simultaneously taken digitized sample vectors of the other received RF signal, an estimator vector whose phase equals that of the vector average of 2m phase difference vectors, each phase difference vector being formed by multiplying the reference sample vector by the complex conjugate of the simultaneously taken digitized sample vector from the other antenna;

d) for each simultaneously taken digitized sample vector of the other received RF signal, shifting the phase of each simultaneously taken digitized sample vector of the other received RF signal by an amount equal to the phase of the corresponding estimator vector average computed in c) by: normalizing the estimator vector computed in c) to provide a normalized estimator vector and then multiplying the simultaneously taken digitized sample vector of the received RF signal to be corrected by the complex conjugate of the normalized estimator vector to provide a phase corrected simultaneously taken digitized sample vector; and, e) combining the phase corrected simultaneously taken digitized sample vector with the reference sample vector by summing the phase corrected simultaneously taken digitized sample vector and the reference sample vector, to provide a single composite signal vector.

13. The method of claim 12 wherein the step of combining the phase corrected simultaneously taken digitized sample vector with the reference sample vector for each set of simultaneously taken digitized sample vectors comprises the computation of the vector sum of the phase corrected simultaneously taken digitized sample vectors and the reference sample vector.

14. The method of claim 13 wherein the combining step includes the step of multiplying each vector with an equal gain prior to summing the vectors.

15. The method of claim 13 wherein the combining step includes the step of multiplying each vector with individual weightings prior to summing the vectors.

16. The method of claim 12 wherein step (c) further comprises the step of summing the phase difference vectors to form a vector with a phase equal to the desired vector average.

17. The method of claim 12 wherein the vector average includes the phase difference vector corresponding to the simultaneously taken digitized sample vector of the other received RF signal.

18. The method of claim 12 wherein the vector average does not include the phase difference vector corresponding to the simultaneously taken digitized sample vector of the other received RF signal.

\* \* \* \* \*

UNITED STATES PATENT AND TRADEMARK OFFICE
CERTIFICATE OF CORRECTION

PATENT NO. : 5,504,786
DATED : April 2, 1996
INVENTOR(S) : Gardner et al.

It is certified that error appears in the above-identified patent and that said Letters Patent is hereby corrected as shown below:

In column 7, Appendix 1 at line 24, please delete "sqi" and insert -- sqri --.

In column 7, Appendix 1 at line 31, please delete " (i0,0) " and insert -- (k0,0) --.

In column 7, Appendix 1 at line 36, please delete " (i0,3) " and insert -- (k0,3) --.

Signed and Sealed this

Seventeenth Day of December, 1996

Attest:

BRUCE LEHMAN

*Attesting Officer*      *Commissioner of Patents and Trademarks*